Figure 1:
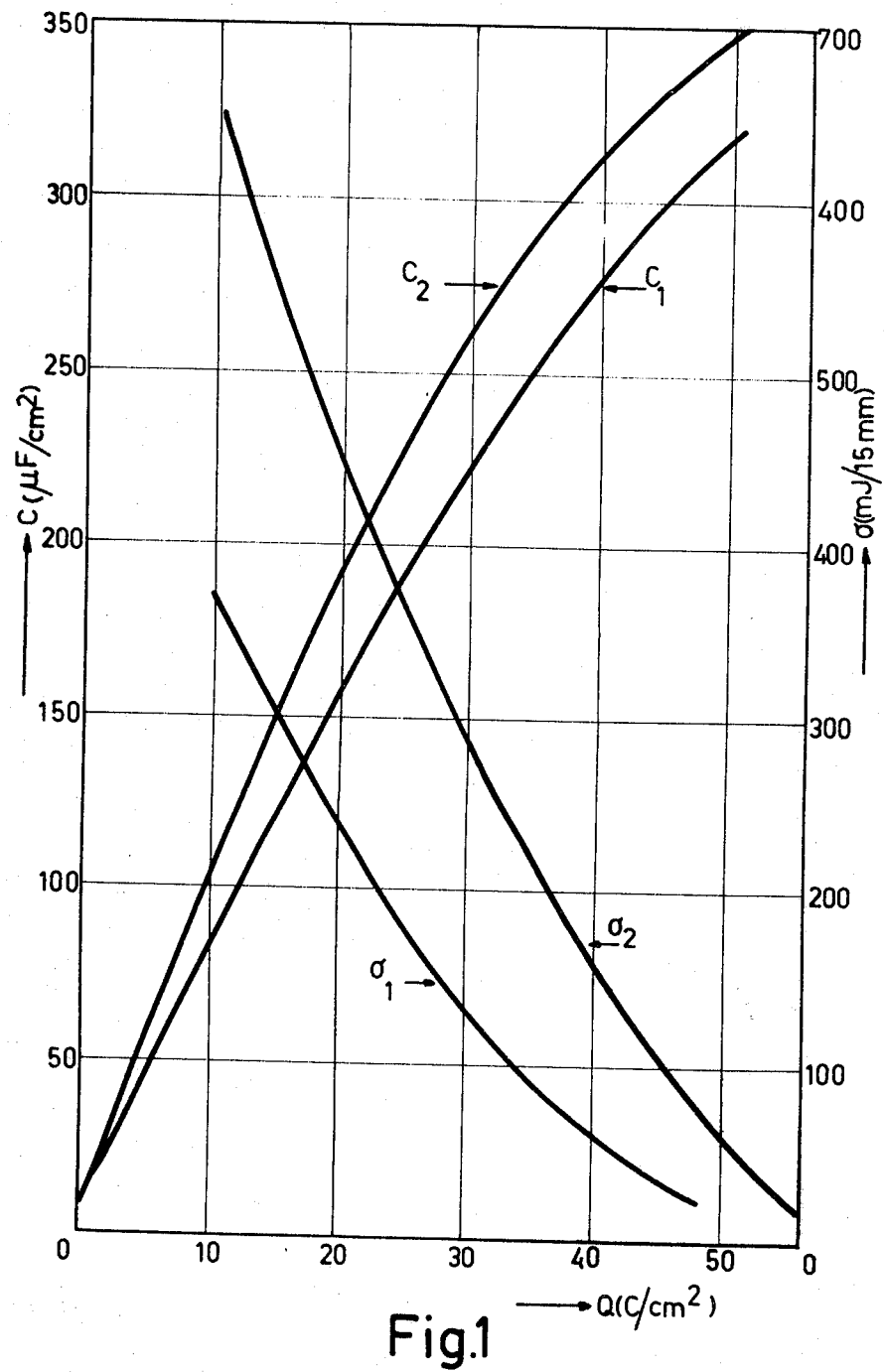

United States Patent [19]

Van Herwijnen et al.

[11] 4,245,276
[45] Jan. 13, 1981

[54] ALUMINUM-MANGANESE CATHODE FOIL FOR ELECTROLYTIC CAPACITORS HAVING CONTROLLED AMOUNTS OF COPPER AND TITANIUM

[75] Inventors: Arend Van Herwijnen; Pieter M. Vogel, both of Zwolle, Netherlands

[73] Assignee: U.S. Philips Corporation, New York, N.Y.

[21] Appl. No.: 930,916

[22] Filed: Aug. 4, 1978

[30] Foreign Application Priority Data

Aug. 22, 1977 [NL] Netherlands ........................ 7709231

[51] Int. Cl.³ .......................... H01G 9/00; B01J 17/00
[52] U.S. Cl. ................................. 361/433; 29/570; 361/272
[58] Field of Search ................. 361/433, 272; 29/570

[56] References Cited

U.S. PATENT DOCUMENTS

| | | | |
|---|---|---|---|
| 3,498,765 | 3/1970 | Hunter | 361/433 |
| 3,599,053 | 8/1971 | Iida | 361/433 |
| 3,665,260 | 5/1972 | Kirkpatrick et al. | 361/433 |
| 3,742,369 | 6/1973 | Douglass | 361/433 |
| 3,899,723 | 8/1975 | Muhlhausser et al. | 361/433 |
| 4,105,513 | 8/1978 | Nishino et al. | 361/433 |
| 4,121,949 | 10/1978 | Walters | 361/433 |

*Primary Examiner*—Andrew J. James
*Attorney, Agent, or Firm*—Thomas A. Briody; Robert T. Mayer; Paul R. Miller

[57] ABSTRACT

Improved cathode foil of an Al-Mn alloy for electrolytical capacitors with which a higher capacitance value and, in accordance with a further elaboration, a higher impact strength of the foil is obtained. To this end the foil has next to 0.2-2 weight % of Mn a Cu-content between 0.15 and 5.3% and preferably a Ti-content between 0.03 and 0.5%.

6 Claims, 2 Drawing Figures

ALUMINUM-MANGANESE CATHODE FOIL FOR ELECTROLYTIC CAPACITORS HAVING CONTROLLED AMOUNTS OF COPPER AND TITANIUM

The invention relates to aluminum foil for electrolytic capacitors and to cathode foil in particular and to electrolytic capacitor manufactured with this foil.

An electrolytic aluminum foil capacitor consists of an anode foil of aluminum provided with a dielectric aluminum oxide skin obtained by anodic oxidation and an etched cathode foil of aluminum which are rolled together with a so-called separator of an insulating material to form a wound body. The wound body is impregnated with an electrolyte liquid and encapsulated.

It is important that the desired capacitance is concentrated on as small a surface area as possible, which means that the metal surface area to be oxidized (forming) must be as large as possible. To this end the surface of the aluminum foil obtained by rolling is subjected to an etching operation. Etching is usually performed electrolytically. To obtain a high capacitance per unit of surface area it is important that the surface area of the cathode foil, which is incapsulated in normal capacitors in a nonformed state, is also enlarged and that in the order of magnitude of the anode foil.

Aluminum of a very high purity, namely Al 99.99% is usually used for the anode foil.

According to U.S. Pat. No. 3,899,723 cathode foil consisting of an aluminium-manganese alloy having a manganese content of 0.2 to 2 weight % is used in an advantageous manner. Besides the fact that this foil has a high capacitance value after etching, so that after assembly with a formed anode foil it furnishes a capacitor having a high CV value, it has, prior to etching, a high impact strength and so the foil suffers less damage when handled prior to, during and after the etching operation compared to foil to which no manganese is added. The specification of this type of alloy having 0.9–1.4% Mn in accordance with the DIN standard 1725, page 1, stipulates the following maximum values for contaminations:

| Si | 0.5 | Cr | 0.05 | other contaminations |
| Fe | 0.6 | Zn | 0.2 | each 0.05 to a total |
| Cu | 0.1 | Ti | 0.1 | of 0.15 |

However, the effects aimed at did not appear to be quite optimal and it was therefore an object of the invention to obtain a further increase in the capacitance value and a still higher impact strength of the foil after etching.

The cathode foil according to the invention is therefore characterized in that it has next to a manganese content of between 0.2 and 2 weight % a copper content of between 0.15 and 5.3 weight %.

In accordance with a further elaboration of the invention an increase in the impact strength in particular is obtained if furthermore the titanium content of the cathode foil is between 0.03 and 0.5 weight %.

Preferably the Mn is between 0.5 and 1.5%, Cu between 0.15 and 0.5 and Ti between 0.05 and 0.25 weight %.

Compared to the foil in accordance with the above-mentioned U.S. Pat. No. 3,899,723 the foil according to the invention has a 20 to 30% higher capacitance after etching with a given number of Coulombs/cm² and, furthermore, an impact strength after etching with a given number of Coulombs/cm² which is approximately a factor of 2 higher.

The latter fact enables an increased through-etching of the foil so that an additional increase of the capacitance is possible, or the choice of a thinner foil as a starting material.

EXAMPLE 1

By way of non-limitative example there now follows a comparison between foil in accordance with the above-mentioned DIN specification (1) and foil according to the invention (2). The relevant compositions in % by weight are:

| (1) | | | (2) | | |
|---|---|---|---|---|---|
| | Mn | 1.0% | | Mn | 1.0% |
| | Cu | 0.10% | | Cu | 0.20% |
| | Ti | 0.02% | | Ti | 0.08% |
| | Fe | 0.6% | | Fe | 0.6% |
| | Si | 0.3% | | Si | 0.3% |
| | Zn | 0.1% | | Zn | 0.1% |
| | Mg | 0.2% | | Mg | 0.2% |
| | Cr | 0.04% | | Cr | 0.04% |
| other contaminants each | | ≦0.05 | | | |
| together | | ≦0.15 | | | |
| Al remainder | | | al remainder | | |

Both foils, having a thickness of 60 μm were electrolytically etched in an aqueous solution of 250 g/l NaCl at different numbers of Coulombs/cm².

The capacitance values were measured in a liquid consisting of a 5% solution of ammonium-pentaborate in water (resistivity 100 Ω.cm) versus a silver-plated counter electrode. The impact strength after etching was determined.

In FIG. 1 of the accompanying drawing the capacitance measured (C in $\mu F/cm^2$) and the impact strength τ measured (in mJ/15 mm foil width) of the two foils (1) and (2) are plotted versus the number of etching Coulombs Q per cm².

The pronounced improvement achieved by the measure according to the invention, particularly in the practically suitable range of etching charges between 10 and 50 Coulombs/cm² is very spectacular. When using the cathode foil according to the invention together with anode foil, a spacer and an electrolyte solution in a complete electrolytical capacitor the capacitance value per volume will be found to be corresponding by higher.

EXAMPLE 2

Figure 2:
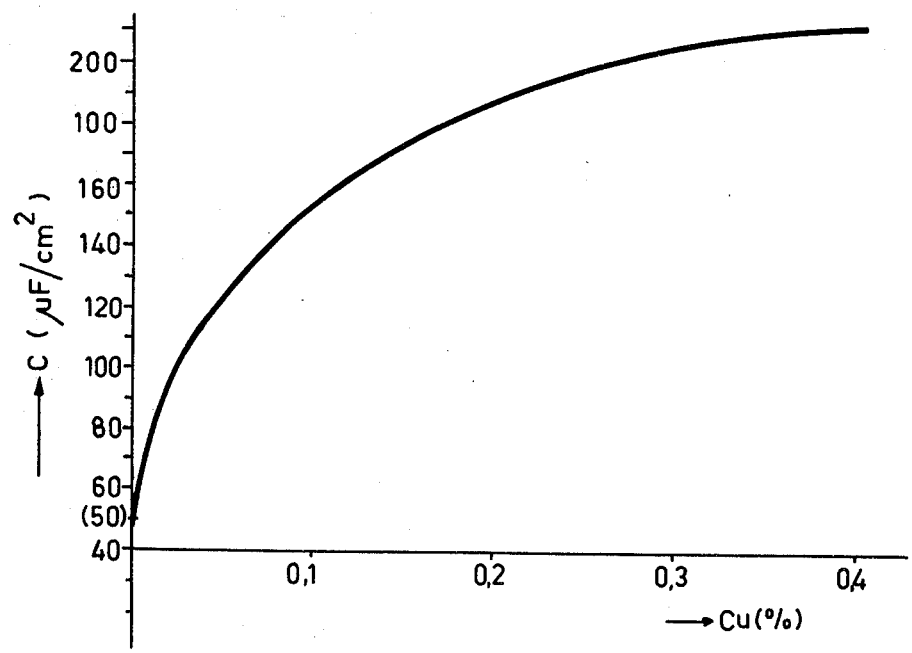

Foils were produced which, starting from Al-99.99%, contained 1% Mn and increasing quantities of Cu from 0 to 0.4%. Etching and capacitance measurement were performed as described in Example 1. FIG. 2 shows the values of the capacitance (C in $\mu F/cm^2$) versus the Cu-content (in weight %).

What is claimed is:

1. A cathode foil for electrolytical capacitors comprising an aluminum-manganese alloy having between 0.2 and 2 weight % of Mn, and a copper content in said alloy of between 0.15 and 5.3 weight %.

2. A cathode foil according to claim 1, wherein said aluminum-manganese alloy includes between 0.03 and 0.5 weight % of titanium.

3. A cathode foil according to claim 2, wherein said aluminum-manganese alloy has a manganese content of between 0.5 and 1.5 weight %, a copper content of between 0.15 and 0.5 weight %, and a titanium content of between 0.05 and 0.25 weight %.

4. An electrolytical foil capacitor comprising an anode member and a cathode member, said cathode member consisting of an aluminum-manganese foil having between 0.2 and 2 weight % of Mn, and between 0.15 and 5.3 weight % of copper.

5. An electrolytical foil capacitor according to claim 4, wherein said aluminum-manganese foil includes between 0.03 and 0.5% weight % of titanium.

6. An electrolytical foil capacitor according to claim 5, wherein said aluminum-manganese foil has a manganese content of between 0.5 and 1.5 weight %, a copper content of between 0.15 and 0.5 weight %, and a titanium content of between 0.05 and 0.25 weight %.

* * * * *